Figure 6:
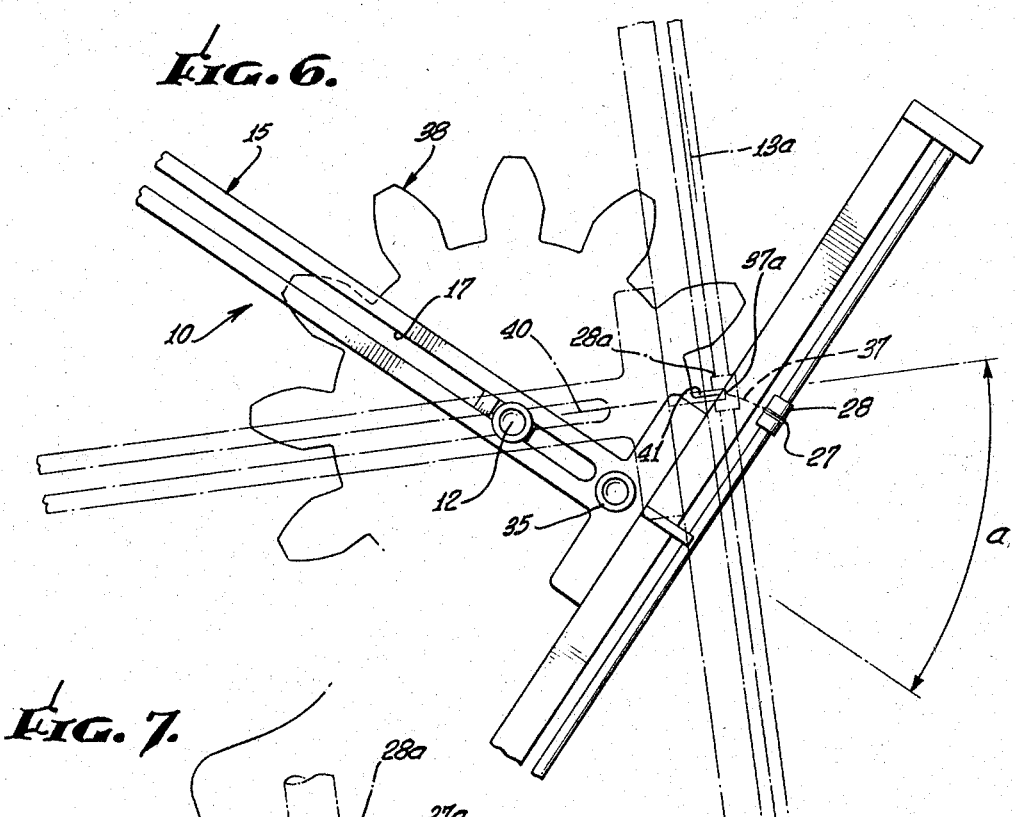

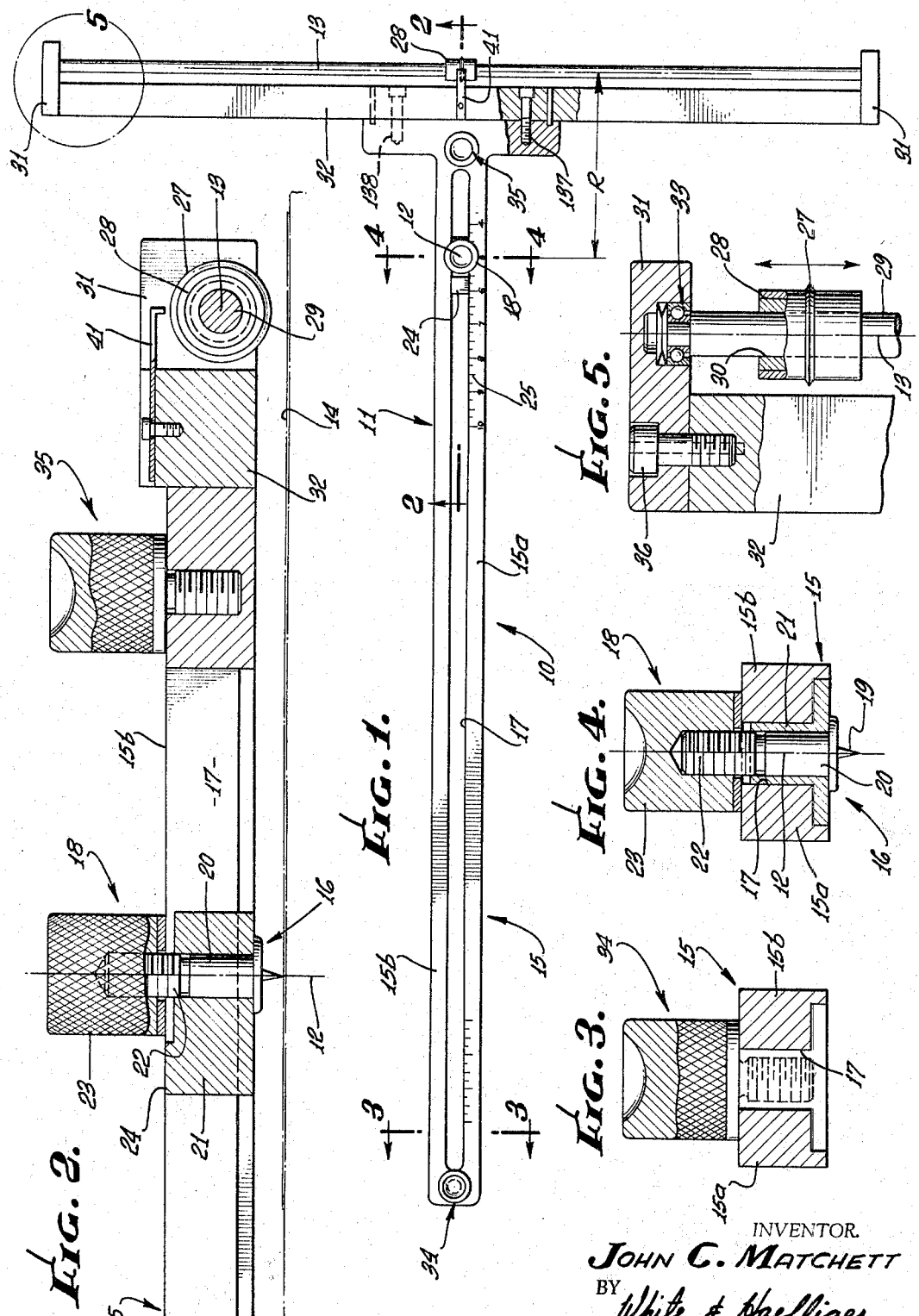

June 6, 1967

J. C. MATCHETT 3,323,213

INVOLUTE GENERATOR

Filed Oct. 3, 1966

2 Sheets-Sheet 2

INVENTOR.
JOHN C. MATCHETT
BY White & Haefliger
ATTORNEYS.

United States Patent Office 3,323,213
Patented June 6, 1967

3,323,213
INVOLUTE GENERATOR
John C. Matchett, Lakewood, Calif., assignor to Task Corporation, Anaheim, Calif., a corporation of California
Filed Oct. 3, 1966, Ser. No. 583,785
5 Claims. (Cl. 33—27)

This invention relates generally to curve generation, and more particularly concerns apparatus to generate an involute curve.

The need for generation of involute curves arises in mechanical design, as for example in the design of accurate gears, the meshing faces of which typically have involute shape. Broadly, an involute is defined as a curve traced by any point of a flexible inextensible thread kept taut as it is wound upon or unwound from another curve, the latter being a base circle in the case of gear design. In the past, gear design has required laborious and time consuming effort to lay out involutes using standard drafting equipment. Typically, tooth forms are laid out in detail, enlarged, and measurements are then taken for use in calculating gear tooth strength; and it can be seen that gear strength and life of gear drives may be drastically reduced if the strength calculations are based on dimensional measurements made on tooth forms having inaccurately drafted involutes. While the string generation method could be used, in practice it is not sufficiently accurate and would require an infinite number of highly accurately circular cylinders for string unwinding, since gear base circles may have any chosen diameters.

It is a major object of the invention to overcome the above problems and to provide an unusually simple, useful, easily and rapidly operable involute generator thereby meeting the need for such an instrument. Basically, the generator comprises means including a frame defining two spaced axes about one of which the frame is rotatable to transport the other axis generally parallel to a surface on which the involute is to be generated, and an involute tracer carried by said means for rotation about and relative bodily movement along said second axis in response to frame rotation about the one axis with the tracer remaining in non-slip engagement with that surface. It is found that such a device does in fact draw an accurate involute, does not require a large number of accurately circular cylinders as the string method would, and has many other unusually desirable advantages. Among the latter is the provision for selection of an infinite number of base circle radii or diameters, and for this purpose the one axis may be defined by a pivot element bodily movable along an elongated way extending on the frame in a plane generally normal to that one axis, the pivot element being connectible in selectible position along the way.

Other objects and advantages of the invention include the provision of a tracer in the form of a line marker extending circularly about the second axis; the provision as a part of the first means of a rotor mounting the circular marker and an elongated shaft defining the second axis and mounting the rotor for relative movement therealong; the shaft for example being rotatable with the marker about the second axis in the event the marker is not rotatable about the shaft; the provision of the frame in the form of a T the stem of which extends generally normal to both of the defined axes.

Figure 7:
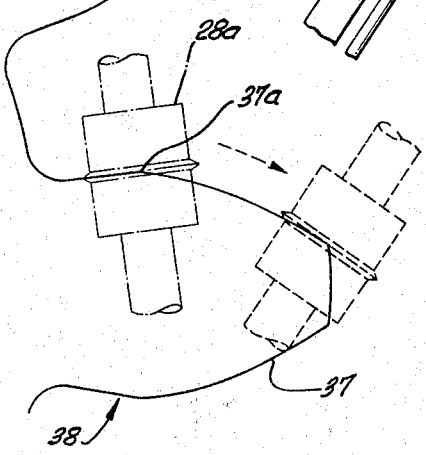
Figure 8:
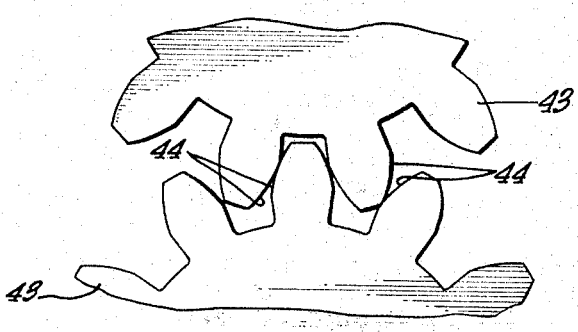

These and other objects and advantages of the invention, as well as the details of illustrative embodiments, will be more fully understood from the following detailed description of the drawings, in which:

FIG. 1 is a plan view of one involute generator incorporating the invention;

FIG. 2 is an enlarged section taken on line 2—2 of FIG. 1;
FIG. 3 is an enlarged section taken on line 3—3 of FIG. 1;
FIG. 4 is an enlarged section taken on line 4—4 of FIG. 1;
FIG. 5 is an enlarged plan view of the circled portion of FIG. 1;
FIG. 6 is a plan view showing a gear tooth involute profile being generated by means of the FIG. 1 device;
FIG. 7 is an enlarged view showing generation of an involute; and
FIG. 8 is a view showing meshing involute surfaces of gear teeth.

Referring first to FIG. 1, the involute generator 10 comprises means including a frame 11 defining two spaced axes about one of which the frame is rotatable to transport the other axis generally parallel to a surface upon which the involute is to be generated. For example, the frame may be rotatable about an axis 12, also seen in FIG. 2, to transport the other axis 13 parallel to the surface 14. In this regard, the frame 11 is shown in the form of a T, the stem 15 of which extends normal to axis 12 and normal to axis 13.

The above mentioned means may typically include a pivot element 16 defining axis 12, and the frame stem 15 is seen as having an elongated way, as for example is defined by the stem slot 17, along which element 16 is movable, there being a connection 18 to hold the pivot element in selected position along the way 17. As better seen in FIG. 4, the pivot element has a point 19 extending downwardly from a body 20 projecting vertically within slipper 21 between frame legs 15a and 15b defining slot 17. The upper terminal 22 of the element 16 is threaded to receive a clamping nut 23 for holding the pivot element in selected position along the way 17. A marker 24 carried on the pivot element between nut 23 and frame 15 has indices adjustable registrable with indices 25 on the frame to indicate the selected distance R between axes 12 and 13, as seen in FIG. 1, R being a radius of curvature corresponding to selected involute curvature.

The generator also includes an involute tracer carried by the above referred to means for rotation about and relative bodily movement along the second axis 13 in response to frame rotation about the pivot axis 12 with the tracer remaining in non-slip engagement with surface 14. In the illustrated example, the tracer comprises a line marker 27 extending circularly about the axis 13, as better seen in FIG. 2. The above referred to means may advantageously include a rotor 28 mounting the circular marker, and an elongated shaft 29 defining axis 13 and mounting the rotor for slidable movement of the shaft through the rotor, with a free sliding interfit at rotor bore 30. Other low friction bearing surfaces may be substituted for that illustrated.

Note also that the shaft 29 is carried by the end terminals 31 of the T frame cross-piece 32 for rotation with the marker 27 about the second axis 13, bearings 33 facilitating such rotation. Alternatively, the rotor 28 may be freely rotatable about the shaft 29, the latter having its ends fixed relative to terminals 31.

Finally, handle members 34 and 35 are suitably attached to the frame along the stem 15 and at opposite sides of the pivot element 16, to permit the operator to rotate the frame about the pivot element for generating the involute. Fasteners shown at 36, 137 and 138 complete the assembly.

In operation, the user selects the desired involute 37 to be generated, as on the gear teeth 38 seen in FIG. 6, by positioning the axis 12 coincident with the gear axis, the rotor 28 being located to tangentially engage the base circle 37a of the involute 37 to be generated. This setting is facilitated by adjustment of the pivot element position along the way 17, and by bringing the rotor 28 into the broken line position 28a seen in FIG. 6. In that position, the circular edge of the line marker extends in a plane 40 which is normal to axis 13a and contains axis 12. A pointer 41 centrally overlies the marker 27 in position 28a.

Thereafter, the frame is rotated about axis 12, as by manipulation of handles 34 and 35, to transport axis 13 parallel to the surface 14 on which involute 37 is to be generated. The tracer having non-slip engagement with surface 14 then rotates about axis 13 and moves bodily therealong to trace the involute 37, and for this purpose the tracer line marker 27 may consist of an inked or leaded edge to draw the involute. See also FIG. 7.

FIG. 8 shows gear teeth 43 with involute surfaces 44 in meshing engagement.

I claim:

1. In an involute generator, means including a frame defining two mutually perpendicular, non-intersecting, spaced axes about one of which the frame is rotatable to transport the other axis generally parallel to a surface on which the involute is to be generated, and an involute tracer comprising a circuluar element concentric with said other axis carried by said means for rotation about and relative bodily movement along said other axis in response to frame rotation about said one axis with the tracer remaining in non-slip engagement with said surface.

2. The generator as defined in claim 1, in which said means includes a pivot element defining said one axis, the frame having an elongated way extending in a plane generally normal to said one axis and along which said element is relatively movable, and a connection to hold said pivot element in selected position along said way.

3. The generator as defined in claim 1, in which said means includes a rotor mounting said circular element, and an elongated shaft defining said second axis and mounting said rotor for relative movement therealong.

4. The generator as defined in claim 3, in which said shaft is carried by said frame for rotation with the marker about said second axis.

5. The generator as defined in claim 4, in which said frame is in the form of a T, the stem of which extends generally normal to both of said axes.

References Cited

UNITED STATES PATENTS

| | | | |
|---|---|---|---|
| 1,326,696 | 12/1919 | Simmons | 33—27 |
| 1,924,405 | 8/1933 | Hughes | 33—27 |

LEONARD FORMAN, *Primary Examiner.*

H. N. HAROIAN, *Assistant Examiner.*